United States Patent [19]
Smith

[11] Patent Number: 5,909,076
[45] Date of Patent: Jun. 1, 1999

[54] MAGNETIC COMMUTATION ALTERNATOR, METHOD OF MANUFACTURE THEREOF AND WIRELESS INFRASTRUCTURE EMPLOYING THE SAME

[75] Inventor: William Craig Smith, Garland, Tex.

[73] Assignee: Lucent Technologies Inc., Murray Hill, N.J.

[21] Appl. No.: 08/918,928

[22] Filed: Aug. 26, 1997

[51] Int. Cl.$^6$ ................................................. H02K 23/00
[52] U.S. Cl. .................... 310/177; 310/156; 270/468; 323/48; 290/46
[58] Field of Search .................. 310/156, 177; 270/468; 323/48; 290/46

[56] References Cited

U.S. PATENT DOCUMENTS

| | | |
|---|---|---|
| 640,760 | 1/1900 | Geisenhoner . |
| 2,716,724 | 8/1955 | Burian . |
| 3,705,343 | 12/1972 | Ringland et al. .......................... 323/48 |
| 4,219,739 | 8/1980 | Greenwell .................................. 290/46 |
| 4,250,424 | 2/1981 | Sento et al. ............................... 310/261 |
| 4,531,071 | 7/1985 | Kintz et al. ............................... 310/156 |
| 4,769,568 | 9/1988 | Kawamura ................................ 310/156 |
| 4,864,174 | 9/1989 | Kawamura et al. ...................... 310/156 |
| 4,954,736 | 9/1990 | Kawamoto et al. ..................... 316/156 |
| 5,371,426 | 12/1994 | Nagate et al. ............................ 310/156 |
| 5,703,881 | 12/1997 | Kay et al. ................................. 370/468 |
| 5,747,909 | 5/1998 | Syverson et al. ........................ 310/156 |

OTHER PUBLICATIONS

Advertisement by "Polar Power Inc."; 2 pages.
Advertisement entitled "3.5 KW PMHH DC Generator for Telecommunications and UPS Systems" by Polar Industries; 2 pages.

*Primary Examiner*—Thomas M. Dougherty
*Assistant Examiner*—Thanh Lam

[57] ABSTRACT

Alternators employing magnetic commutation, methods of manufacturing the alternators and wireless communications infrastructures employing the alternators. In one embodiment, an alternator includes: (1) a stator having 4n alternating field and armature poles extending axially along and projecting from an inner surface thereof, n being a positive integer, the field poles having field windings disposed thereabout to form alternating North-South magnetic polar regions and the armature poles having armature windings disposed thereabout to allow conduction of electric power from the armature poles, (2) a rotor, disposed within and journalled for rotation relative to the stator, having 2n axial magnetic passive regions, each of the passive regions being of a circumferential width magnetically to bridge one of the armature poles and only one of the field poles and (3) an exciter, coupled to the stator, that provides a controlled level of DC excitation to the field poles to regulate an output of the alternator.

20 Claims, 8 Drawing Sheets

MAGNETIC COMMUTATION ALTERNATOR, METHOD OF MANUFACTURE THEREOF AND WIRELESS INFRASTRUCTURE EMPLOYING THE SAME

TECHNICAL FIELD OF THE INVENTION

The present invention is directed, in general, to dynamo-electric machines and, more specifically, to an alternator that employs magnetic commutation, a method of manufacturing the alternator and a wireless communications infrastructure employing the same.

BACKGROUND OF THE INVENTION

Conversion of electromagnetic energy occurs when a change in flux is associated with mechanical motion as described by Faraday's law, $e=d\Phi/dt$. In alternators, voltages are typically generated in windings by rotating the windings mechanically through a magnetic field, by mechanically rotating a magnetic field past the windings or by designing the magnetic circuit such that the reluctance varies with the rotation of a rotor of the alternator. A time varying voltage is generated when the flux linking a specific coil is changed cyclically by any of the above-described methods.

One type of alternator is a brushless alternator. Brushless alternators can be viewed from a perspective of a variable reluctance transformer. To produce an AC output from the alternator, a varying magnetic field must be produced. The varying magnetic field may be accomplished using a permanent magnet for a magnetic core of the alternator and eliminating a primary direct current (DC) winding entirely, or by using a DC excitation. The permanent magnet approach can regulate the AC output only by varying the speed of the passage of the magnet with respect to the output winding. Thus, to produce rapid regulation responses to changing loads, large amounts of mechanical inertia must be overcome thereby resulting in a relatively sluggish regulation associated with large changing loads.

More specifically, a brushless alternator can be modeled as a variable transformer. Employing a DC excitation to produce a magnetic field, a smaller DC input power produces a larger output AC power. The additional power is the result of the mechanical force placed on the magnetic core. The output voltage increases with an increase of the motion of the magnetic core through the magnetic field ($d\Phi/dt$ increases due to rate of travel), or when a stronger magnetic field is applied ($d\Phi/dt$ increases due to stronger magnetic flux) to the magnetic core. To produce fast regulation of the AC output voltage at a constant speed, the DC current in the primary winding must be changed rapidly. The regulation speed is determined by a field driver, leakage inductances and magnetic remanences in the magnetic core.

The various alternator construction architectures presently employed include the homopolar, heteropolar, induction-type and brushless exciter. With a homopolar architecture, the magnetic flux is always in one direction. The flux intensity may vary, but the polarity (i.e., positive or negative) will remain the same. Since the flux is unidirectional and does not change polarity, only half of the total available flux change in the magnetic structure is used. As a result, the magnetic core saturates prematurely thereby placing a fixed upper limit on the total available output power. Limited flux reversal capability in a stator of the alternator is possible if a permanent magnet is used in the rotor, but regulation of the output voltage at no-load is still difficult. The speed of the rotor would have to decrease to zero to obtain $d\Phi/dt=0$.

The heteropolar architecture overcomes the saturation limitation associated with the homopolar model by allowing changes in the flux direction in the rotor as the rotor turns. The flux direction in the stator, however, is still unidirectional requiring twice as much magnetic material in the stator than if the flux could reverse. Furthermore, due to the phasing complexity of AC field excitation, a more complex measurement and control circuit is required.

For both the homopolar and heteropolar generators, the flux is always in the same direction on a "per-tooth" basis (i.e., each armature winding has only a modulated DC flux). As a result, only half (or less) of the magnetic material is used because of a DC bias in the armature of the alternator. Also, the output of the alternator may fold back as the magnetic field about the rotor increases.

The brushless exciter is used in many commercial AC generators currently in operation including large-scale commercial power generation. The exciter rotor and the alternator stator experience full flux reversal per rotation. The fluxes can be designed to maximize the use of the magnetic core material for specified power levels because the number of winding turns can be different on both the alternator and exciter rotors. The saturation limitation problem still exists because the flux is unidirectional in the alternator rotor. While rotary rectifiers are employed in the brushless exciter, the rectifier diodes experience voltage drops and heat losses that contribute to dissipative energy losses in the alternator. Furthermore, the rotary rectifiers must be mechanically secured to withstand the high centrifugal forces generated when the rotor is rotating. The stress on the rotary rectifiers decreases the reliability of the brushless exciter.

Full flux reversal can be obtained in both the stator and rotor by employing the induction-type alternator. A major limitation of the induction-type alternator is that a complex control circuit is necessary to provide a carefully phased AC for excitation thereof. Additionally, there is a need for shorted-turns windings (i.e., squirrel-cage windings) in the rotor thereby increasing dissipative heat losses in the alternator. In the inductor alternators (i.e., homopolar and heteropolar), as well as in the alternators used in automobiles (i.e., Lundell "claw" type), a magnetic field break is necessary due to the circulating parallel field in the shaft-core combination of the alternator. The magnetic field would otherwise pass through the bearings, generating arcs of DC electrical current, thereby causing premature deterioration of the bearings. The magnetic break in the shaft can produce a mechanically weak torsion point in the shaft that limits power from the prime mover.

Accordingly, there is a need in the art for an improved alternator design architecture that mitigates the above-mentioned limitations. In particular, there is a need for an improved alternator that maximizes the use of the magnetic flux to reduce the volume of magnetic core material required. There is a further need for an improved alternator that can respond to large load changes with faster speed regulation. Finally, there is a need for an improved alternator with fewer components and moving parts to increase the overall alternator reliability.

SUMMARY OF THE INVENTION

To address the above-discussed deficiencies of the prior art, the present invention provides alternators employing magnetic commutation, methods of manufacturing the alternators and wireless communications infrastructures employing the alternators. In one embodiment, an alternator includes: (1) a stator having 4n alternating field and armature poles extending axially along and projecting from an inner surface thereof, n being a positive integer, the field poles having field windings disposed thereabout to form alternating North-South magnetic polar regions and the armature poles having armature windings disposed thereabout to allow conduction of electric power from the armature poles, (2) a rotor, disposed within and journalled for rotation relative to the stator, having 2n axial magnetic passive regions, each of the passive regions being of a circumferential width magnetically to bridge one of the armature poles and only one of the field poles and (3) an exciter, coupled to the stator, that provides a controlled level of DC excitation to the field poles to regulate an output of the alternator.

In one embodiment of the present invention, the stator and the rotor are formed of pluralities of laminations. Those skilled in the art are familiar with conventional dynamoelectric machines having stators or rotors formed of separate laminations.

In one embodiment of the present invention, the rotor comprises a nonmagnetic central section and at least two magnetic peripheral sections joined with the central section and forming the magnetic passive regions. The nonmagnetic central section ensures that the at least two magnetic peripheral sections do not magnetically couple together.

In one embodiment of the present invention, the stator and the rotor are divided longitudinally into m phase sections, m being a positive integer, the alternator being an m-phase alternator. Thus, the present invention contemplates an alternator that provides polyphase (most likely three phase) power.

In one embodiment of the present invention, the rotor comprises a central section composed of a plastic material. Those skilled in the art will readily perceive the range of materials suitable for constructing the central section given the description of its function that follows.

In one embodiment of the present invention, the rotor comprises a plurality of dovetailed sections. The dovetails lock the sections together, rendering the rotor less susceptible to disintegration under centripetal acceleration.

In one embodiment of the present invention, the stator (or the magnetic peripheral sections of the rotor, for that matter) is composed of a sintered magnetic material or ferrite. Most preferably, the sintered magnetic material is iron.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
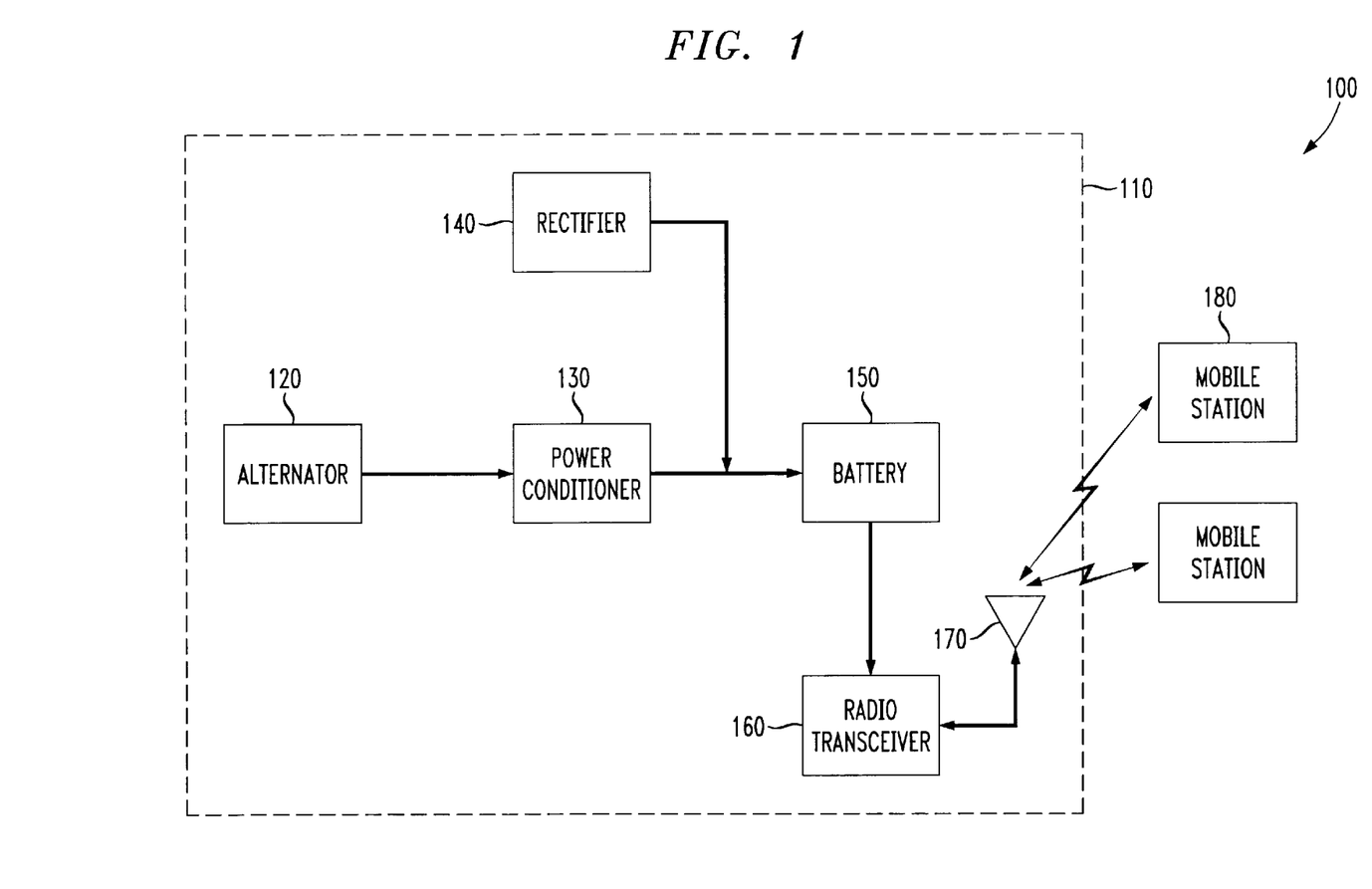
FIG. 1 illustrates an exemplary wireless infrastructure that contains a magnetic commutation alternator according to the present invention.

Referring initially to FIG. 1, illustrated is an exemplary wireless infrastructure 100 according to the present invention and that provides an environment within which a magnetic commutation alternator 120 constructed according to the present invention may operate. A base station 110 includes the magnetic commutation alternator 120 which is illustrated as being coupled to a power conditioner 130. A battery 150 is coupled to the power conditioner 130 and to a rectifier 140. Also shown is a radio transceiver 160 which is coupled to the battery 150. The radio transceiver 160 is also coupled to an antenna 170 which is coupled to a plurality of mobile stations (one of which is designated 180).

The magnetic commutation alternator 120 provides input power, typically 24VAC, to the power conditioner 130. The power conditioner 130, in turn, rectifies and filters the 24VAC input power to 24VDC output power. Similarly, the rectifier 140 rectifies the line power (e.g., 220VAC) to 24VDC. The 24VDC output power from both the rectifier 140 and the power conditioner 130 are supplied to the battery 150, which is the power supply for the radio transceiver 160. In normal system operation, the prime power source to the battery 150 is the rectifier 140. The magnetic commutation alternator 120 role is typically as a back-up power source to the battery 150.

Figure 2:
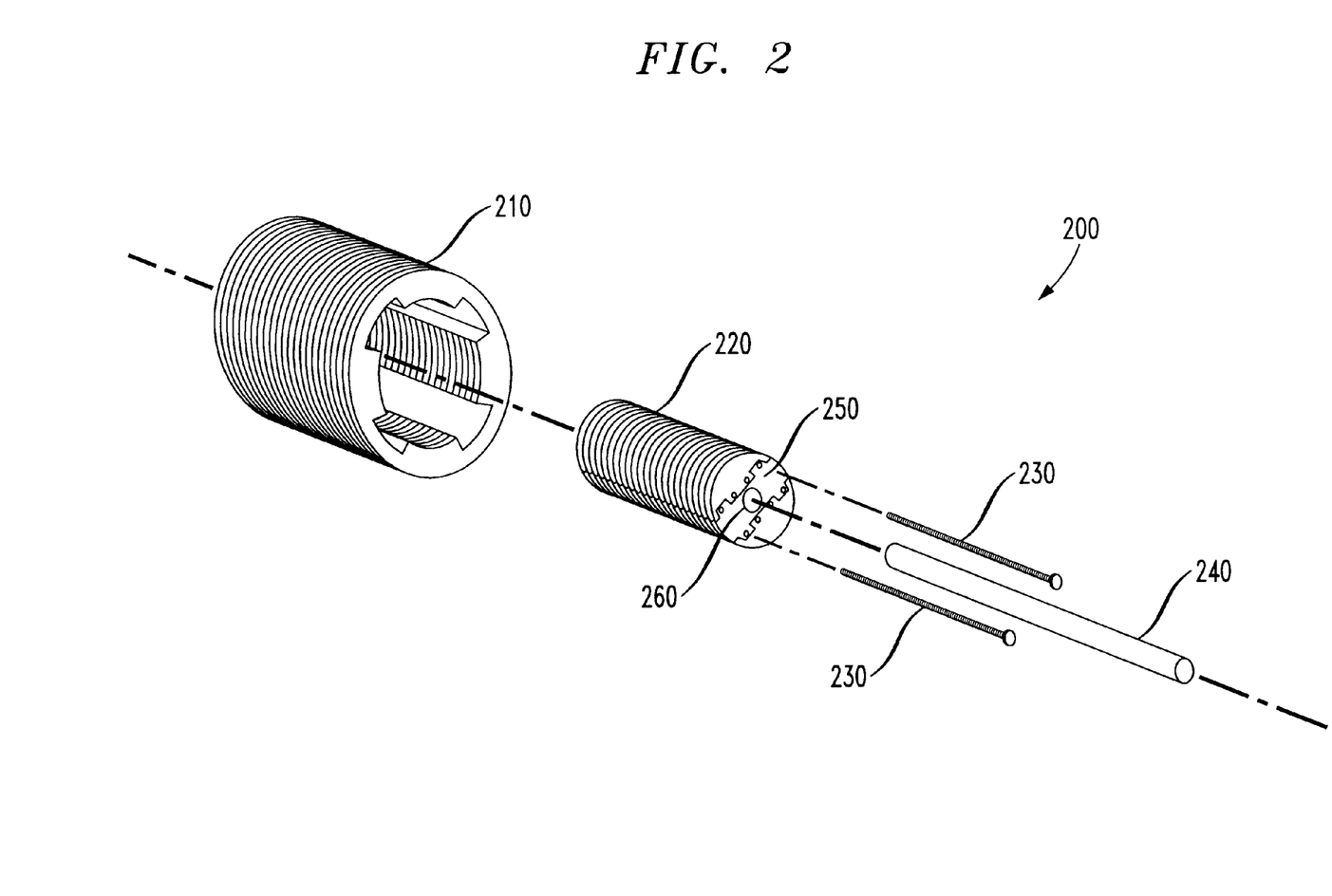
FIG. 2 illustrates an exemplary construction of an embodiment of a magnetic commutation alternator according to the present invention.

Turning now to FIG. 2, illustrated is an exemplary construction of an embodiment of a magnetic commutator alternator 200 assembly according to the present invention. The magnetic commutator alternator 200 is a four pole device, but those skilled in the art should readily understand that other topologies, including those having more than four poles, are possible. A stator 210 is made from the traditional type of lamination, typically iron, with the difference being that the field and armature windings (not shown) alternate as the angle around the stator 210 increases. The stator 210 may also be composed of a sintered magnetic material or ferrite. The stator 210 houses a rotor 220 which is constructed of a plurality of alternating sets of stamped laminations (one of which is designated 250). The plurality of stamped laminations 250 are secured to each other with a plurality of retaining bolts 230 that extend throughout the length of the rotor 220. Rivets may be used in place of the retaining bolts 230 to fasten the stamped laminations 250 securely together. Those skilled in the art should be familiar with other fastening methods that may be used in lieu of those methods described above. A shaft 240 is press-fitted into the plurality of stamped laminations 250 and the rotor 220 is allowed to rotate about the longitudinal axis of the shaft 240. Although a round shaft hole 260 is shown in FIG. 1, the torque can be applied with a splined shaft/hole arrangement, a set of shaft "flats" or with a keyway. The present invention is not limited to the torque application as described above and other methods are well known in the art.

Figure 3:
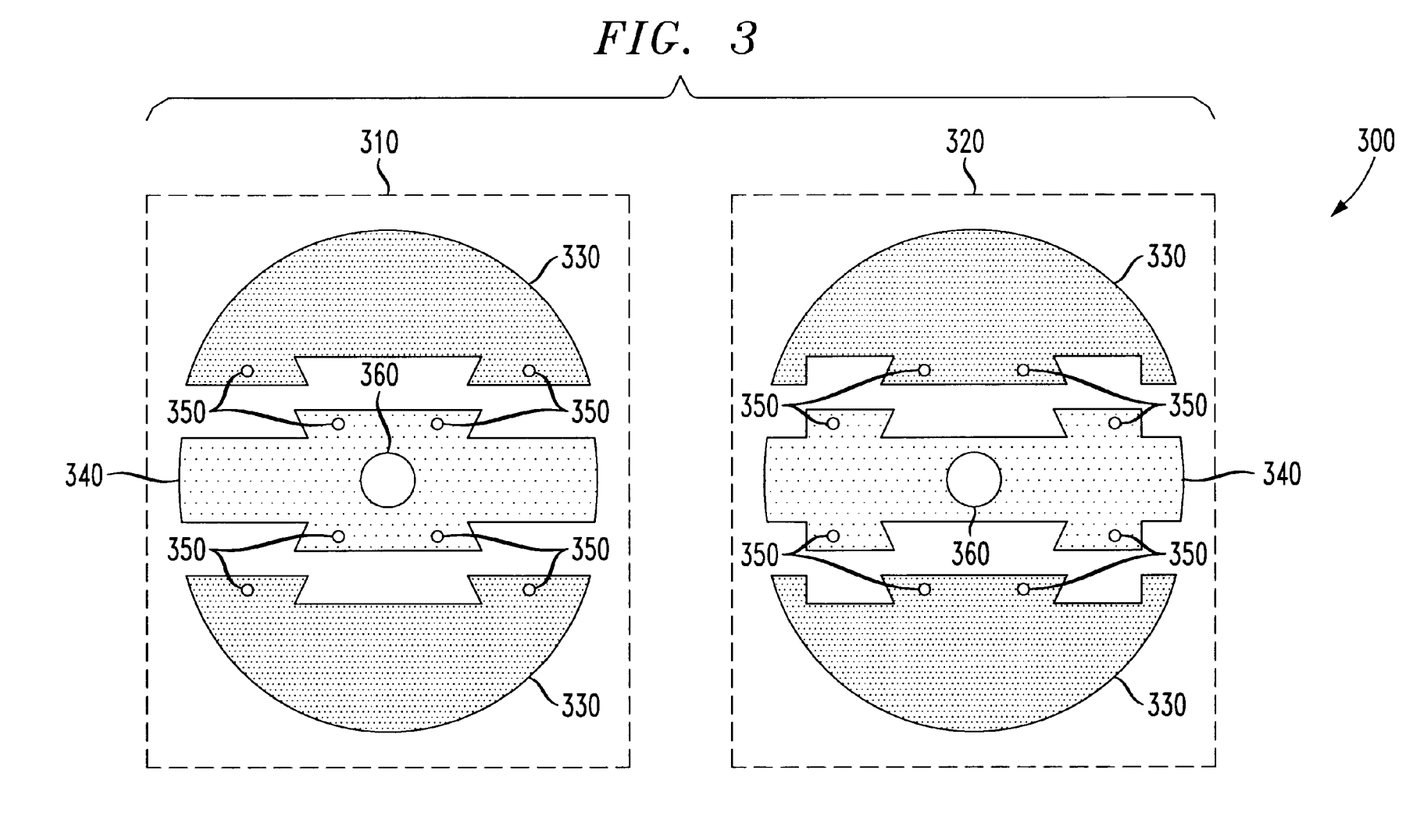
FIG. 3 illustrates an embodiment of a set of stamped laminations constructed according to the present invention.

Turning now to FIG. 3, illustrated is an embodiment of a set of stamped laminations 300 constructed according to the present invention. An even magnetic passive region 310 and an odd magnetic passive region 320 constitute the stamped laminations 300. The even magnetic passive region 310 includes a plurality of magnetic peripheral sections 330 and a nonmagnetic central section 340. Similarly, the odd magnetic passive region 320 also includes a plurality of magnetic peripheral sections 330 and a nonmagnetic central section 340. The stamped patterns shown in FIG. 3 are for illustrative purposes only; those skilled in the art should be aware that the patterns are typically based on operational, design or manufacturing considerations.

The magnetic peripheral section 330 is illustrated as being a stamped magnetic material, typically iron. The nonmagnetic central section 340 may be made of a high-tensile aluminum alloy. If aluminum is used in the nonmagnetic central section 340, eddy currents could flow in the aluminum during operation of the present invention, even though aluminum is a non-ferrous material. To prevent these eddy currents, both the magnetic peripheral section 330 and the nonmagnetic central section 340 should be in the form of insulated laminations. A molded plastic material could be used for the nonmagnetic central section 340, but it is recommended that the plastic material be a heat resistant fiber reinforced composite material.

The magnetic peripheral section 330 and the nonmagnetic central section 340 are typically stamped with a plurality of holes 350. The plurality of holes 350 allow the retaining bolts 230 to securely fasten sets of the stamped laminations 300. The nonmagnetic central section 340 is also stamped with a shaft clearance hole 360 and the shaft 240 is attached to the stamped laminations 300 using one of the methods described above.

The magnetic peripheral section 330 and the nonmagnetic central section 340 are constructed to allow both sections to dovetail into each other. The rotor 220 is constructed with the plurality of alternating even magnetic passive regions 310 and odd magnetic passive regions 320. Since the dovetails alternate, the magnetic peripheral sections 330 are fastened firmly to the nonmagnetic central sections 340. After the rotor 220 is vacuum impregnated with epoxy varnish, an almost monolithic rotor results.

There should be no internal torsional vibration, delamination or flying apart if the retaining bolts 230 or rivets with small clearances and sufficient shear strength are used. In larger machines, the number of the retaining bolts 230 or rivets may be increased to accommodate the larger output forces (i.e., centripetal and magnetic) during output short circuit conditions. Also, since the rotor 220 is passive (i.e., no rotor windings are needed), no noise generating slip rings are present to wear out.

Figure 4:
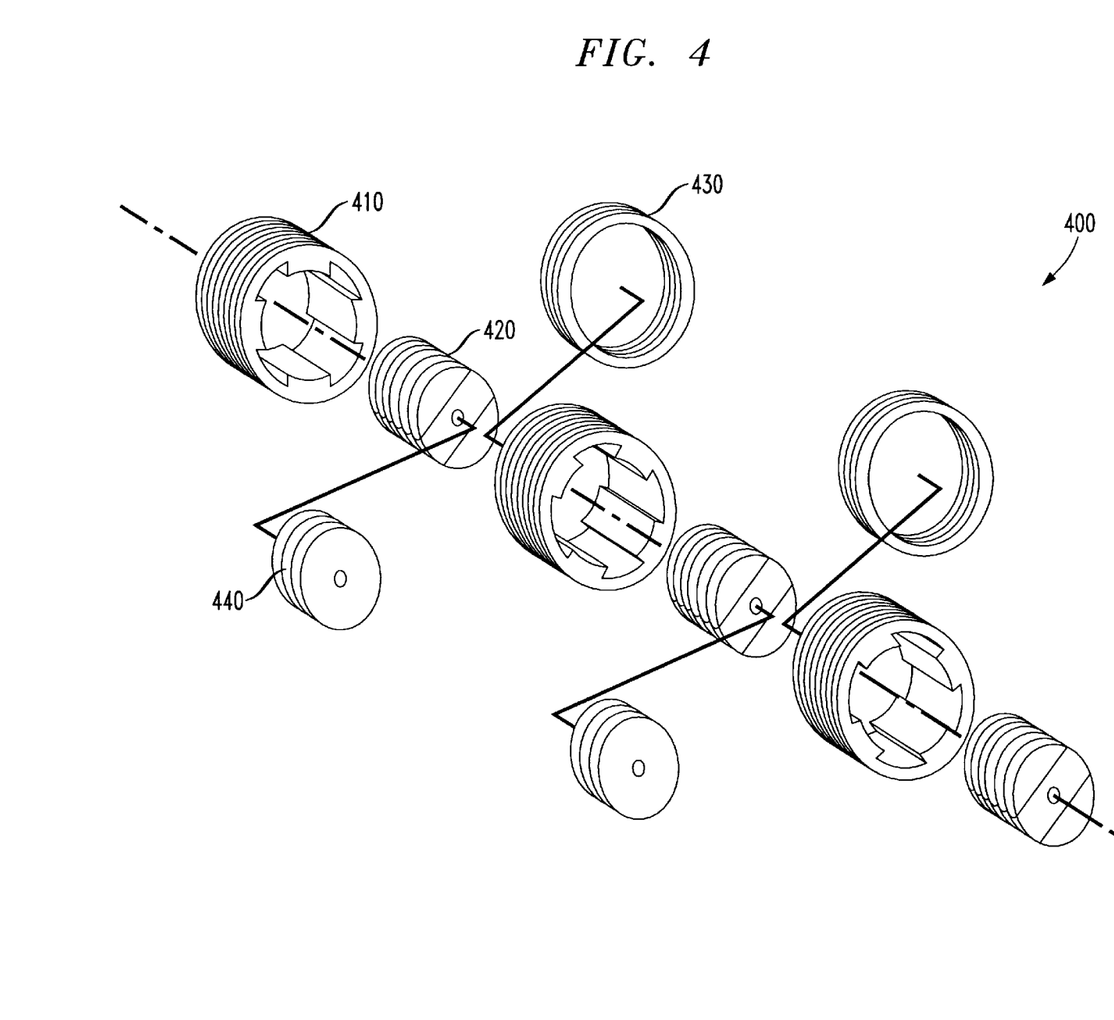
FIG. 4 illustrates an exemplary construction of a polyphase alternator according to the present invention.

Turning now to FIG. 4, illustrated is an exemplary construction of an embodiment of a polyphase alternator 400 according to the present invention. The polyphase alternator 400 includes a plurality of stators (one of which is designated 410). Each of the plurality of stators 410 has a corresponding rotor assembly (one of which designated 420) which together constitute a phase section. The plurality of stators 410 are magnetically isolated from each other with the use of a plurality of aluminum rings (one of which is designated 430). Similarly, the plurality of rotors 420 are magnetically isolated from each other by a plurality of aluminum disks (one of which is designated 440).

For three phase AC power generation, three stators 410 and three rotors 420 are required. Each of the stators 410 is displaced by 120° of rotation to permit three phase power generation. Also, by controlling the stacking factor, gap distances and rotor "twist," a sinusoidal output can be produced. Techniques used to produce a sinusoidal output are well known in the art.

Figure 5A:
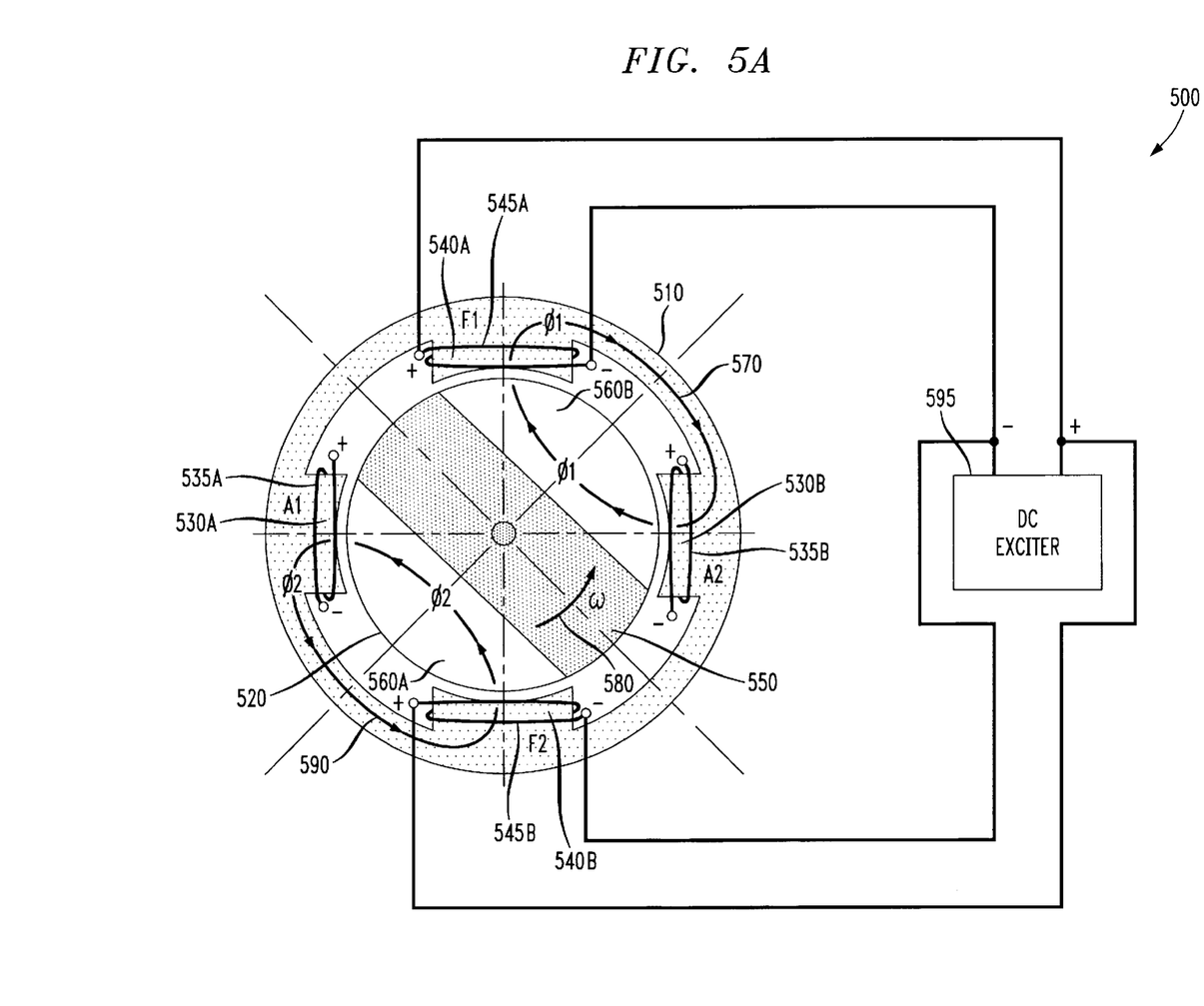
FIGS. 5A, 5B and 5C illustrate transverse cross-sectional views of a magnetic commutation alternator according to the present invention.
Figure 5B:
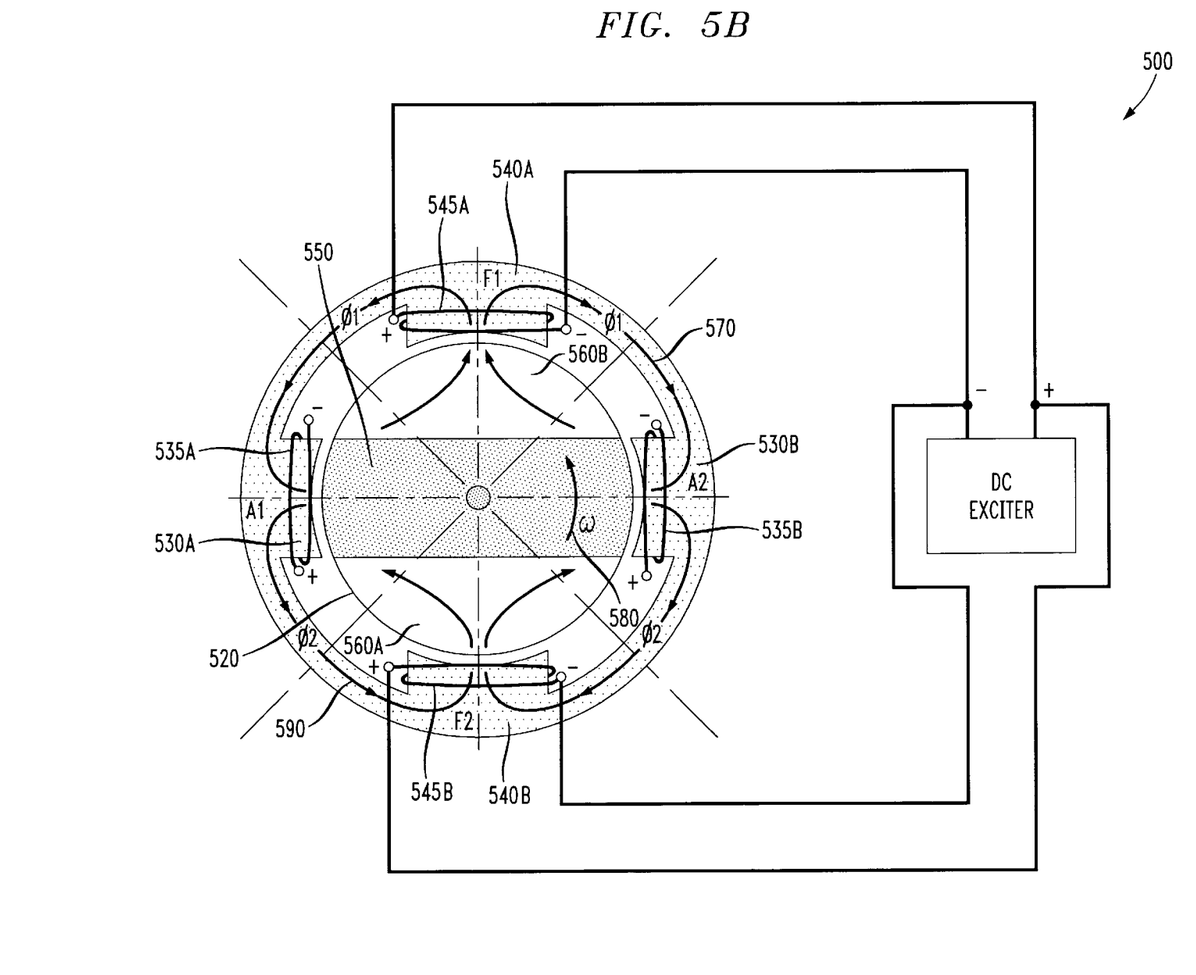
Figure 5C:
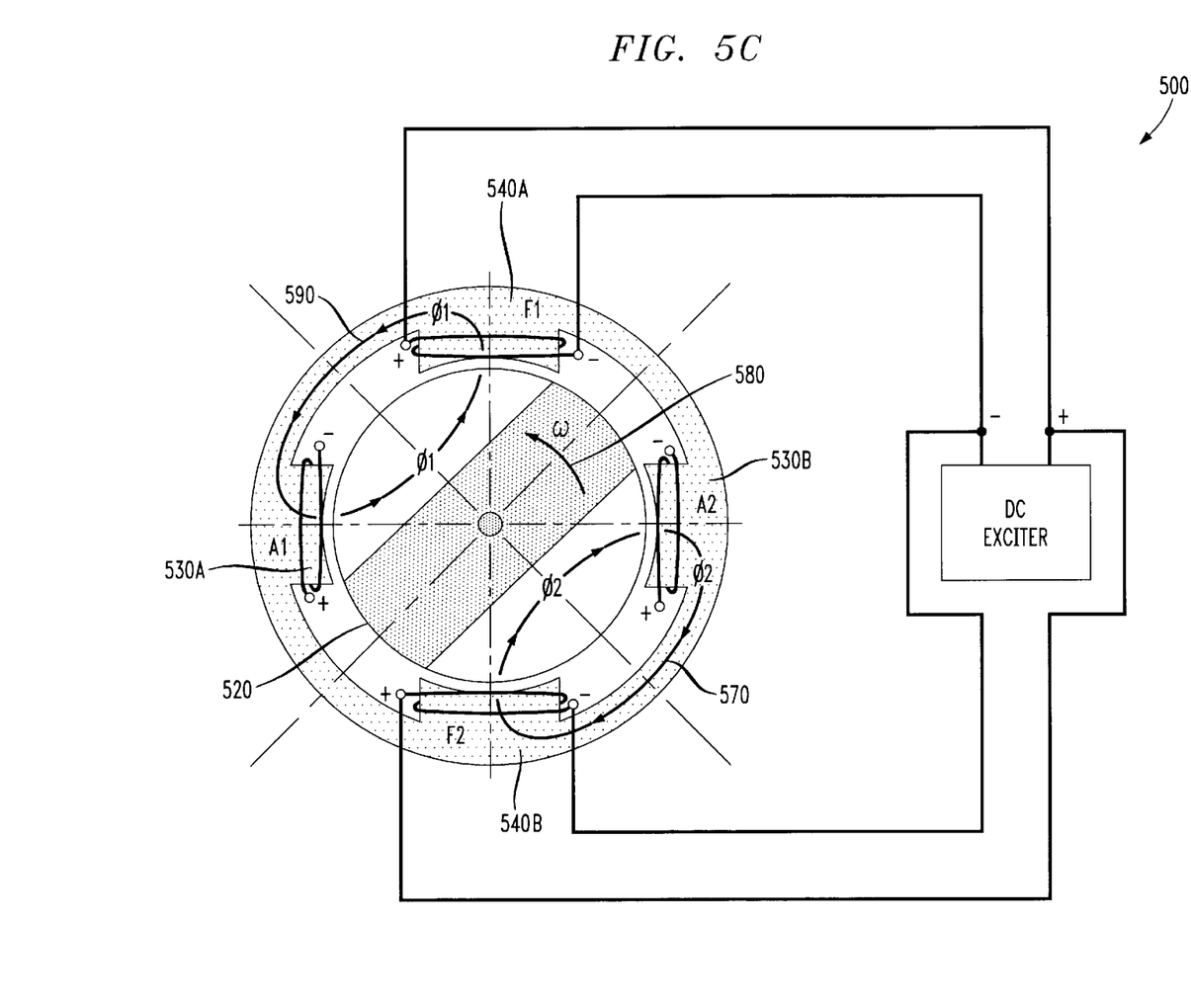

Turning now to FIGS. 5A, 5B and 5C, illustrated are transverse, cross-sectional views of a magnetic commutation alternator 500 according to the present invention. The magnetic commutation alternator 500 includes a stator 510 which further includes a plurality of armature poles 530A, 530B wrapped by a plurality of armature windings 535A, 535B, respectively. The stator 510 also includes a plurality of field poles 540A, 540B similarly wrapped with a plurality of field windings 545A, 545B, respectively. The plurality of field poles 540A, 540B carry the DC field current in the polarity directions shown in FIG. 5. The magnetizing DC field current is typically provided by an external battery or from the magnetic commutation alternator's 500 own rectified output. The regulation of the AC output voltage is controlled by an exciter 595, the construction and operation of which is well known in the art. By using a few primary turns and applying large changes in voltages to the field windings, fast regulation of the AC output power at a constant speed can be obtained. Also shown is a rotor 520 which includes a non-permeable section 550 and a plurality of permeable sections 560A, 560B. The rotational velocity 580 indicates the direction of travel of the rotor 520 during operation of the alternator 500; a plurality of magnetic flux lines 570, 590 link the field poles 540A, 540B to the armature poles 530A, 530B.

Figure 6:
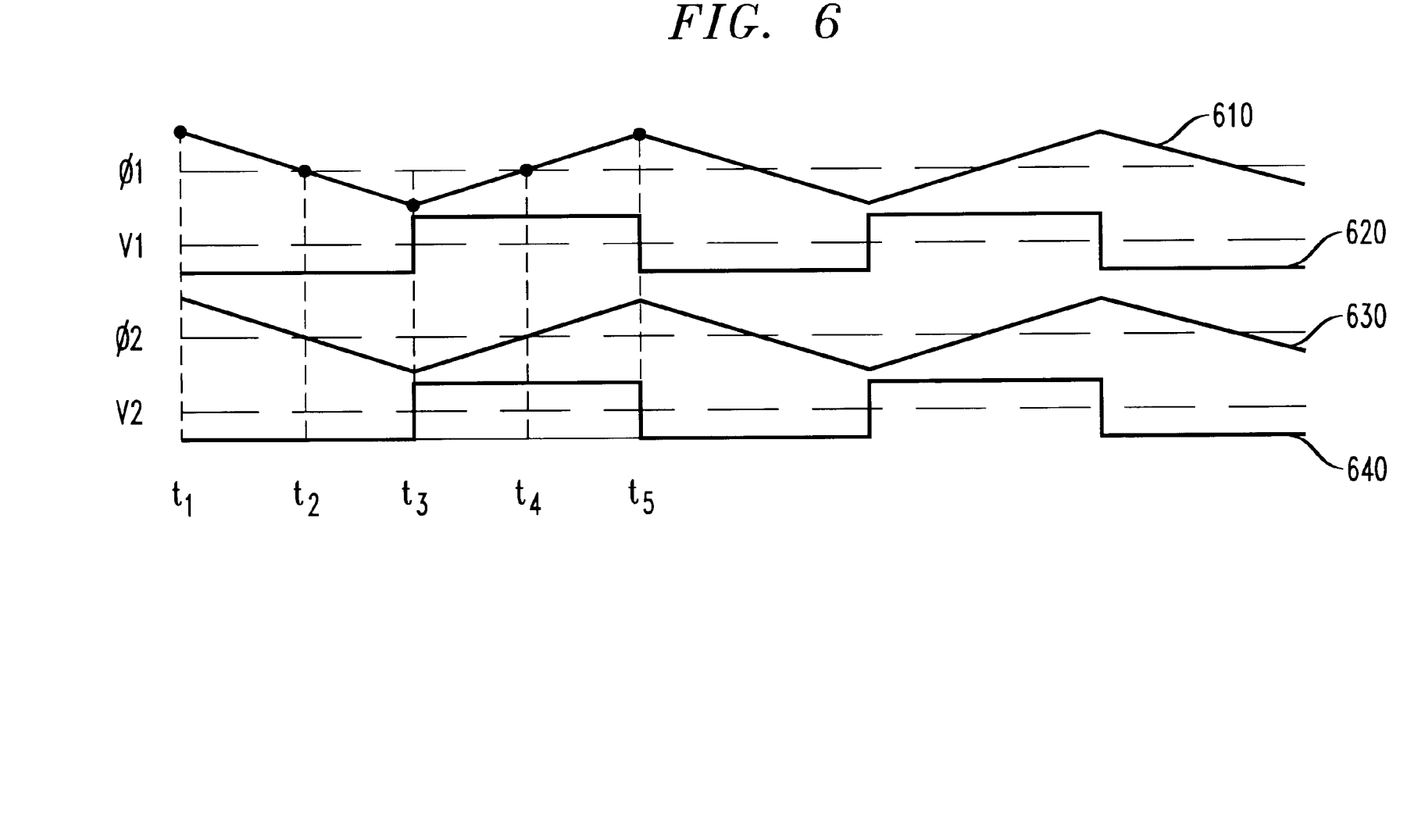
FIG. 6 illustrates a timing diagram that depicts selected voltages and magnetic flux linkages during an exemplary rotational cycle of the magnetic commutation alternator illustrated in FIG. 5.

Turning now to FIG. 6, illustrates a timing diagram that depicts selected voltages and magnetic flux linkages during an exemplary rotational cycle of the magnetic commutation alternator illustrated in FIG. 5. With continuing reference to FIGS. 5A, 5B, 5C, the basic operation of the magnetic commutation alternator 500 will hereinafter be described. It should be noted that the relative sizes of the separations between time periods $t_1$, $t_2$, $t_3$, $t_4$ and $t_5$ are drawn for clarity and ease of explanation, and are not necessarily to scale.

The first and second magnetic flux linkage waveforms 610, 630 illustrate the magnitude of magnetic flux linkages between the field poles 540A, 540B and the armature poles 530A, 530B. At the first time period $t_1$ (corresponding to the position of the rotor 520 shown in FIG. 5A), the magnetic flux lines 570, 590 curve through the stator 510 and the permeable sections 560A, 560B producing maximum magnetic flux linkages between the field poles 540A, 540B and the armature poles 530A, 530B, respectively. The resulting polarities of the armature windings 535A, 535B are also shown in FIG. 5A. The magnetic flux lines 570, 590 vary linearly with the angle of rotation because the area of the permeable sections 560A, 560B exposed to the armature poles 530A, 530B varies linearly with the angle of rotation. The linear change in the magnetic flux results in a square wave voltage output from the generator (not shown) as indicated by the first and second output waveforms 620, 640. As the rotor 520 rotates in the direction indicated by rotational velocity 580, the intensity of the flux decreases until it reaches nearly zero at a second time period $t_2$ (the position of the rotor 520 as illustrated in FIG. 5B). At the second time period $t_2$, minimum flux linkage exists because the ends of the permeable sections 560A, 560B are relatively close to the ends of the armature poles 530A, 530B. At this position, since the sign (i.e., positive or negative) of the flux is opposite, the weak linkage fields will cancel out in the armature poles 530A, 530B producing the zero-crossing point. Also note that since the output voltage spends minimum time at the zero-crossings, the output waveform is ideally suitable for rectification. The square wave may be rectified with diodes and provided to an output filter (not shown).

Between the second and third periods $t_2$, $t_3$, the magnetic flux linkages increase linearly as more of the permeable sections 560A, 560B are exposed to the armature poles 530A, 530B. Since the field poles 540A, 540B are excited with DC voltage, the polarities of the field windings 545A, 545B and the resultant magnetic flux direction remain the same. During this period, the non-permeable section 550 of the rotor 520 links the opposite armature poles 530A, 530B causing the magnetic flux lines 570, 590 to reverse directions. With the reversal in magnetic flux directions, the polarities of the armature windings 535A, 535B also reverse. At the third period $t_3$ (corresponding to the position of the rotor 520 depicted in FIG. 5C), maximum magnetic flux linkages between the field poles 540A, 540B and the armature poles 530A, 530B are again obtained as illustrated in the first and second magnetic flux linkage waveforms 610, 630. As the rotor 520 continues to rotate in the direction indicated by rotational velocity 580, the magnetic flux lines 570, 590 decrease until another zero-crossing point is reached at the fourth time period $t_4$. The polarities of the armature poles 530A, 530B reverse again and the magnetic flux lines 570, 590 increase until the fifth time period $t_5$, when maximum magnetic flux linkages are obtained. At this time, the rotor 520 has completed a 180° angle of rotation.

For the exemplary magnetic commutation alternator 500 illustrated in FIGS. 5A, 5B, 5C, a two-pole architecture in which one full revolution of the rotor 520 results in two AC cycles. In each AC cycle, the magnetic flux reverses polarity in both the rotor 520 and the armature poles 530A, 530B. The only region where the magnetic flux does not fully reverse is within the top and bottom ⅓ sections of the stator 510 close to the field poles 540A, 540B. In this region, however, the magnetic flux swings between zero and maximum magnetic flux density everywhere except within the actual field windings 545A, 545B, as opposed to between a minimum magnetic flux density (not zero) and maximum magnetic flux density when using a heteropolar or homopolar alternator. The remainder of the stator 510 and the rotor 520 will experience large magnetic flux reversals. The saturation limiting factors are the face of the field windings, the magnetic material in the field windings and the stator. Note, that if the excitation source is AC, the field windings also experience flux reversal.

Furthermore, because no DC bias exists in the armatures or the rotor, full swing range of the magnetic material is available resulting in a size and weight reduction over the prior art architectures. Also, since the magnetic field is orthogonal to the shaft rotation, the prime mover power is not limited because no magnetic break in the shaft is required to prevent bearing damage.

For a better understanding of power electronics including alternator and generator designs, see "A .C. Generators, Design and Application" by Robert L. Ames, Research Studies Press Ltd. (1990). The aforementioned reference is herein incorporated by reference.

Although the present invention has been described in detail, those skilled in the art should understand that they can make various changes, substitutions and alterations herein without departing from the spirit and scope of the invention in its broadest form.

What is claimed is:

1. An alternator, comprising:

a stator having 4n alternating field and armature poles extending axially along and projecting from an inner surface thereof, n being a positive integer, said field poles having field windings disposed thereabout to form alternating North-South magnetic polar regions and said armature poles having armature windings disposed thereabout to allow conduction of electric power from said armature poles;

a rotor, disposed within and journalled for rotation relative to said stator, having 2n axial magnetic passive regions, each of said passive regions being of a circumferential width magnetically to bridge one of said armature poles and only one of said field poles; and an exciter, coupled to said stator, that provides a controlled level of DC excitation to said field poles to regulate an output of said alternator.

2. The alternator as recited in claim 1 wherein said stator and said rotor are formed of pluralities of laminations.

3. The alternator as recited in claim 1 wherein said rotor comprises a nonmagnetic central section and at least two magnetic peripheral sections joined with said central section and forming said magnetic passive regions.

4. The alternator as recited in claim 1 wherein said stator and said rotor are divided longitudinally into m phase sections, m being a positive integer, said alternator being an m-phase alternator.

5. The alternator as recited in claim 1 wherein said rotor comprises a central section composed of a plastic material.

6. The alternator as recited in claim 1 wherein said rotor comprises a plurality of dovetailed sections.

7. The alternator as recited in claim 1 wherein said stator is composed of a magnetic material selected from the group consisting of:

a sintered magnetic material, and a ferrite.

8. A method of manufacturing an alternator, comprising the steps of:

forming a stator having 4n alternating field and armature poles extending axially along and projecting from an inner surface thereof, n being a positive integer;

disposing field windings about said field poles to form alternating North-South magnetic polar regions;

disposing armature windings about said armature poles to allow conduction of electric power from said armature poles;

forming a rotor, disposable within and journalled for rotation relative to said stator, having 2n axial magnetic passive regions, each of said passive regions being of a circumferential width magnetically to bridge one of said armature poles and only one of said field poles; and coupling an exciter to said stator to provide a controlled level of DC excitation to said field poles to regulate an output of said alternator.

9. The method as recited in claim 8 wherein said stator and said rotor are formed of pluralities of laminations.

10. The method as recited in claim 8 wherein said step of forming said rotor comprises the step of joining a nonmagnetic central section and at least two magnetic peripheral sections.

11. The method as recited in claim 8 wherein said stator and said rotor are divided longitudinally into m phase sections, m being a positive integer, said alternator being an m-phase alternator.

12. The method as recited in claim 8 wherein said step of forming said rotor comprises the step of molding a central section from a plastic material.

13. The method as recited in claim 8 wherein said step of forming said rotor comprises the step of joining a plurality of dovetailed sections.

14. The method as recited in claim 8 wherein said step of forming said stator comprises the step of forming said stator composed of a magnetic material selected from the group consisting of:

a sintered magnetic material, and a ferrite.

15. A wireless infrastructure, comprising:

a plurality of mobile stations wirelessly couplable to effect wireless telecommunication therebetween;

a plurality of base stations, wirelessly couplable to ones of said plurality of mobile stations, that relay said wireless telecommunication between said mobile stations, each of said plurality of base stations having a battery back-up power source, said battery back-up power source having a battery and a generator-driven alternator for providing power to said battery, said alternator including:

a stator having 4n alternating field and armature poles extending axially along and projecting from an inner surface thereof, n being a positive integer, said field poles having field windings disposed thereabout to form alternating North-South magnetic polar regions and said armature poles having armature windings disposed thereabout to allow conduction of electric power from said armature poles;

a rotor, disposed within and journalled for rotation relative to said stator, having 2n axial magnetic passive regions, each of said passive regions being of a circumferential width magnetically to bridge one of said armature poles and only one of said field poles; and an exciter, coupled to said stator, that provides a controlled level of DC excitation to said field poles to regulate an output of said alternator.

16. The infrastructure as recited in claim 15 wherein said stator and said rotor are formed of pluralities of laminations.

17. The infrastructure as recited in claim 15 wherein said rotor comprises a nonmagnetic central section and at least two magnetic peripheral sections joined with said central section and forming said magnetic passive regions.

18. The infrastructure as recited in claim 15 wherein said rotor comprises a central section composed of a plastic material.

19. The infrastructure as recited in claim 15 wherein said rotor comprises a plurality of dovetailed sections.

20. The infrastructure as recited in claim 15 wherein said stator is composed of a magnetic material selected from the group consisting of:

a sintered magnetic material, and a ferrite.

* * * * *